United States Patent
Taylor et al.

(10) Patent No.: US 8,707,886 B2
(45) Date of Patent: Apr. 29, 2014

(54) PROTECTION CAP ASSEMBLY WITH LEAK DETECTION CAPABILITY FOR A PRESSURIZED VALVE

(75) Inventors: Julian S. Taylor, Oklahoma City, OK (US); Christopher F. Rooney, Edmond, OK (US); Matthew Ryan Wisner, Mustang, OK (US); John Alan Boyd, III, Oklahoma City, OK (US)

(73) Assignee: Taylor Innovations, L.L.C., Oklahoma City, OK (US)

( * ) Notice: Subject to any disclaimer, the term of this patent is extended or adjusted under 35 U.S.C. 154(b) by 434 days.

(21) Appl. No.: 12/949,309

(22) Filed: Nov. 18, 2010

(65) Prior Publication Data

US 2011/0278291 A1    Nov. 17, 2011

Related U.S. Application Data

(60) Provisional application No. 61/345,525, filed on May 17, 2010.

(51) Int. Cl.
*G01L 19/12* (2006.01)

(52) U.S. Cl.
USPC .......................................... 116/70; 116/67 R (58) Field of Classification Search
USPC ............ 454/2, 4, 367; 220/DIG. 13, DIG. 16, 220/203.01; 116/70, 67 R
See application file for complete search history.

(56) References Cited

U.S. PATENT DOCUMENTS

| | | | |
|---|---|---|---|
| 489,215 A | 1/1893 | Brown | |
| 2,856,887 A | 10/1955 | Scully | |
| 3,081,789 A | 3/1963 | Scully | |
| 4,184,516 A | 1/1980 | Oesterritter et al. | |
| 4,239,184 A | 12/1980 | Dudar | |
| 4,936,351 A | 6/1990 | Wells et al. | |
| 5,876,282 A * | 3/1999 | Kenny | ........................... 454/367 |
| 6,047,739 A | 4/2000 | Nixon | |

(Continued)

FOREIGN PATENT DOCUMENTS

| | | |
|---|---|---|
| CN | 1299451 A | 6/2001 |
| WO | WO9956047 A2 | 11/1999 |

OTHER PUBLICATIONS

"Massa Products Corporation—Models E-173H/E-194" from Jul. 3, 2001, http://web.archive.org/web/20010703004847/http://www.massa.com/datasheets/e173.html.*

(Continued)

*Primary Examiner* — Daniel S Larkin
*Assistant Examiner* — Irving A Campbell
(74) *Attorney, Agent, or Firm* — Hall Estill Attorneys at Law (57) ABSTRACT

A protective cap assembly for a pressurized valve adapted to detect a leak therethrough. In accordance with various embodiments, the cap assembly includes a body adapted for placement in fluid communication with the valve, and a sensory indicator supported by the cap assembly body to provide human sensory indication of pressurized fluid leaking from the valve in its closed position. In various embodiments, the sensory indicator can be a whistle that makes an audible sound, a light emitting device that emits a visible light, or both. In further embodiments, the cap assembly body can be coupled to the vent conduit via a tether, and ejected responsive to exhausted pressurized fluid when the valve transitions to the open position. The displaced cap assembly body serves as a visual indication that the valve has opened.

23 Claims, 9 Drawing Sheets

(56) References Cited

U.S. PATENT DOCUMENTS

| | | |
|---|---|---|
| 6,725,800 B2 | 4/2004 | Hawkins |
| 7,152,469 B2 * | 12/2006 | Milleker et al. ............... 73/262 |
| 2002/0029808 A1 * | 3/2002 | Friend et al. ................. 137/551 |
| 2008/0196768 A1 | 8/2008 | Steffan |

OTHER PUBLICATIONS

English Translation of Chinese Office Action issued Mar. 18, 2013 for Chinese application corresponding to U.S. Appl. No. 12/949,309.

* cited by examiner

OPEN CIRCUIT

FIG. 16A

CLOSED CIRCUIT

COLLAPSED STATE

PROTECTION CAP ASSEMBLY WITH LEAK DETECTION CAPABILITY FOR A PRESSURIZED VALVE

RELATED APPLICATIONS

The present application makes a claim of domestic priority to U.S. Provisional Patent Application No. 61/345,525 filed May 17, 2010.

BACKGROUND

Pressurized fluids, such as liquid or gaseous hydrocarbons, steam, water, etc., can be transported and directed through piping networks. Various pressurized valve configurations are used to direct and condition fluid flow through the networks, such as, for example, pressure relief valves, emergency shutdown valves, blowdown valves, flapper valves, ball valves and pressure reducing valves, also called chokes.

Some valves provide the capability to vent a portion of the fluids to an alternative routing path, such as to the surrounding atmosphere, when an upper or lower pressure threshold is reached, as some types of normally closed pressure relief valves. It is known to provide removable weather covers on vertically extending vent conduits to prevent foreign matter intrusion, such as in to the vent conduits. It is also known to tether such covers so that, should a pressure relief valve be tripped to open, blowing the cover off the vent conduit, and providing indication of a blow by incident. One such exemplary weather cap assembly is disclosed by U.S. Pat. No. 5,876,282 to Kenny.

While operable, weather covers such as taught by the Kenny '282 patent generally only serve to provide visual notification when a pressure relief valve has opened, and do not enable detection of other deleterious conditions, such as the presence of a leak through a closed valve. Accordingly, there remains a continual need for improvements in the monitoring of pressurized fluid systems to maximize indicia signaling change in operational conditions.

SUMMARY

Various embodiments of the present invention are generally directed to a protective cap assembly for a pressurized valve, the cap assembly capable of sensing a leak through the valve.

In accordance with various embodiments, the cap assembly has a cap body that is positioned to be in fluid communication with the valve. Sensory means supported by the cap body provides a direct human sensory indication of pressurized fluid leaking from the valve while the valve is in a closed position.

In some embodiments, the sensory means comprises a whistle that generates a human audible tone (whistle) by the pressurized fluid leaking from the valve. In other embodiments, the sensory means is a light emitting device that emits a visible light by the pressurized fluid leaking from the valve in the closed position. In yet further embodiments, the sensory means includes both a whistle that makes an audible sound and a light emitting device that emits a visible light, both activate by the pressurized fluid leaking from the valve in the closed position.

Additionally, in some embodiments the cap body is configured to be forced away from the valve or a vent conduit attached thereto by pressurized fluid exhausted from the valve when the valve is in the open position. A tether retains the cap assembly body in proximity to the valve when displaced so that the removed cap assembly body serves as a visual indication that the valve has opened.

Exemplary features and advantages of the various embodiments presented herein will be recognized by persons of skill in the art upon reading the following description along with the appended drawings and claims.

BRIEF DESCRIPTION OF DRAWINGS

FIG. 20 D is an end elevational view of the cap assembly of FIG. 20A.

DETAILED DESCRIPTION

Without limitation, various embodiments of the present invention are generally directed to an environmental protection cap assembly configured to provide human sensory indication of the presence of fluid passage in a pressurized fluid system.

As explained below, in some embodiments a cap assembly is configured to cover an exhaust conduit downstream from a pressurized valve that vents to the surrounding atmosphere. The cap assembly provides an indication that the valve has a low-level leak of flowing fluid through the valve by providing an audible and/or visual indication. In some embodiments, a whistle can be used to provide an audible indication of a leak; in other embodiments, an LED can be used to provide a visual indication of a leak.

Figures 1, 2:
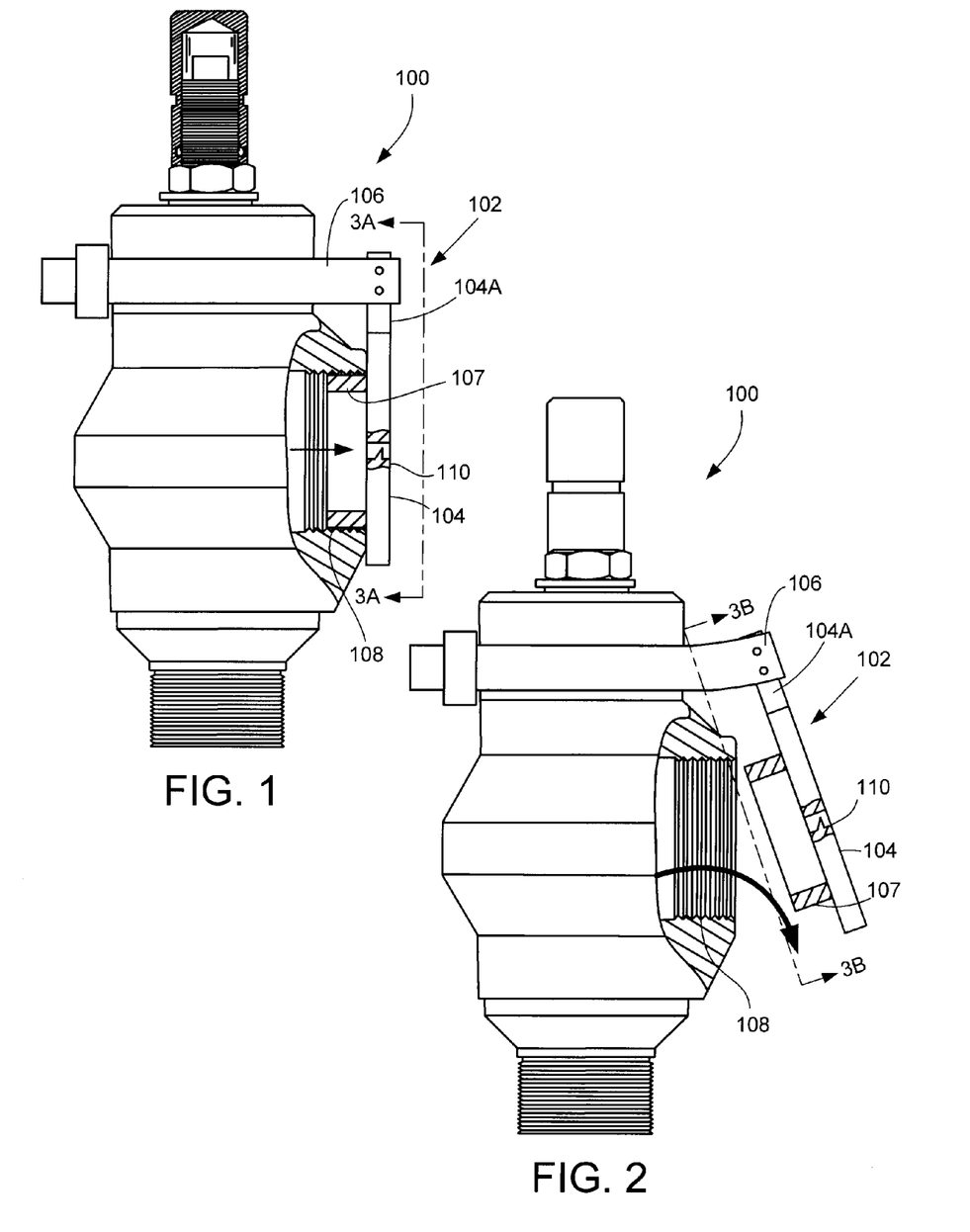
FIG. 1 is an elevational, partial cutaway view of a pressure relief valve in a closed position and having an environmental protection cap assembly constructed in accordance with various embodiments of the present invention.
FIG. 2 is an elevational, partial cutaway view of the pressure relief valve of FIG. 1 in an open position as the result of a fluid overpressure condition.

FIG. 1 shows a pressure relief valve 100 having an environmental protection cap assembly 102 attached thereto. The pressure relief valve 100 is of the normally closed type so that, during normal processing, upstream pressurized fluid (such as gas or liquid) is contained by the valve using an internal valve seat (not shown in FIG. 1). The cap assembly 102 includes a body portion or cover plate 104 secured to the main body of the pressure relief valve by an adjustable strap 106 or other attaching means. The plate 104 has an inwardly projecting annular flange 107 configured to contactingly engage internally disposed threads 108 of an outlet port of the pressure relief valve 100.

If a small amount of pressurized fluid passes through the valve, such as via a leak through the valve seat, the pressurized fluid will flow through a sensory indicator (whistle) 110, thereby producing an audible indication of a fluid passage to nearby service personnel. It has been found through empirical analysis that a tone on the order of from about 90 to 100 dB can be produced by such whistle 110, providing an effective range for human detection of upwards of 100 feet or more.

FIG. 2 shows the pressure relief valve of FIG. 1 in an open position responsive to the pressure of the pressurized fluid reaching a predetermined threshold. The pressure relief valve has accordingly opened to vent the fluid to the surrounding atmosphere. The flow of the vented fluid displaces the cover plate 104 from engagement with the valve body, allowing the vented pressurized fluid to escape while providing a visual indication to nearby service personnel that the pressure relief valve has opened.

Figures 3A, 3B:
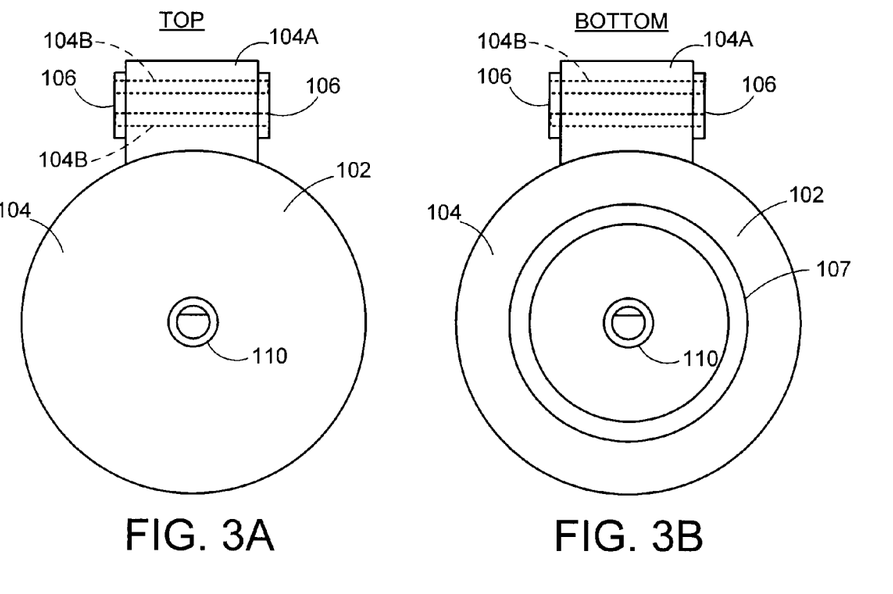
FIG. 3A is a view taken at 3A-3A in FIG. 1.
FIG. 3B is a view taken at 3B-3B in FIG. 2.

FIGS. 3A and 3B show a top plan view and a bottom plan view, respectively, of the cover plate 104 portion of the cap assembly 102. It will be appreciated that any number of different configurations can be used, so those shown in the drawings are merely exemplary and not limiting. The cap assembly 102 is affixed to the pressure relief valve 100 by the aforementioned strap 106 that loops about the body of the valve 100 and attaches at each end to a tab portion 104A of the cover plate 104 by stakes 104B.

Figure 4:
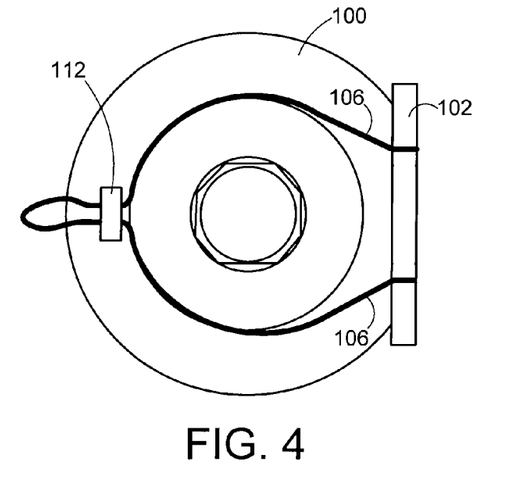
FIG. 4 is a top plan view of the pressure relief valve and protection cap assembly of FIG. 1.

FIG. 4 illustrates the strap 106 as a drawstring-type nylon or similar plastic material having an adjustment mechanism 112 that cinches and draws the cap assembly 102 onto the pressure relief valve 100.

Figure 5:
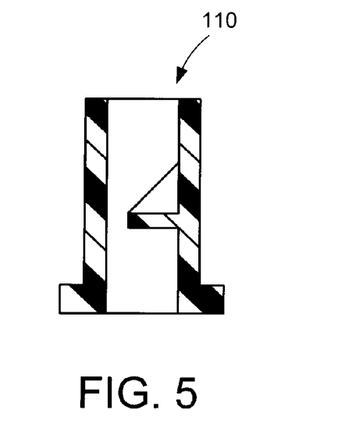
FIG. 5 is a partial cutaway view of the whistle portion of the protection cap assembly of FIG. 1.

The whistle 110 is shown in partial cutaway view in FIG. 5, and is supported in a bore extending through the cover plate 104 as depicted in FIGS. 1-3. The whistle 110 can be characterized as a flute-type member that restricts the passage of fluid to produce an audible sound in a range of human hearing. Other whistle configurations, such as reed configurations, can be readily used as desired.

Figure 6A:
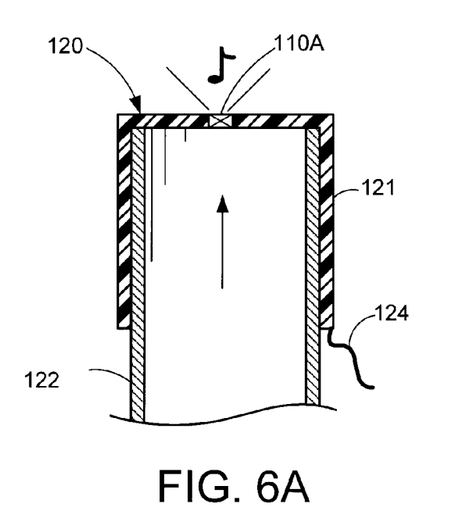
FIG. 6A is an elevational side view in cross section of another environmental protection cap assembly constructed in accordance with some embodiments of the present invention.

FIG. 6A shows an alternative configuration for another environmental cap assembly 120. The cap assembly 120 has an inverted, substantially cup-shaped body portion 121 that is configured to slide over the end of an exhaust vent conduit 122 to provide environmental protection to the conduit. The vent conduit 122 may connect to, and extend from, the outlet port of an upstream pressurized valve such as 100 in FIGS. 1-2. The vent conduit 122 may have a right-angle bend (not shown) that serves to angle the end of the vent conduit 122 upwardly.

A whistle 110A, similar to that shown in FIG. 5, is supported in a bore extending through the end of the cap assembly 120 to provide an audible indication of a leak through the closed valve as before. A suitable tether 124 (lanyard), such as an aircraft cable or nylon cord, can be attached at one end to the body 121. The other end of the tether 124 can be conveniently tied to a stationary member to retain the cap assembly in near proximity. The length of the tether 124 is determined so as to provide sufficient slack to permit the cap assembly 120 to be forced from the vent conduit 122 by passage of pressurized fluid when the pressure relief valve to which the vent conduit 122 attaches is opened to blow off pressure.

Once displaced from the upper end of the vent conduit 122, the dangling cap portion 121 will be retained in near proximity to the vent conduit 122 by the tether 124, providing a visual indication that the pressure relief valve has transitioned to the open position.

Figure 6B:
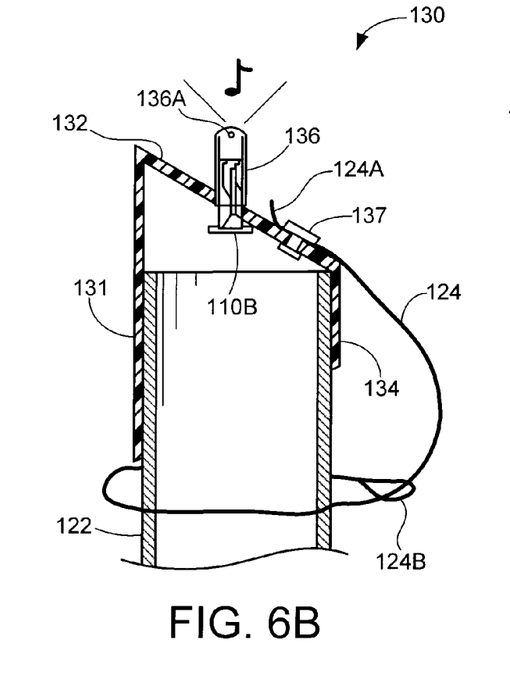
FIG. 6B is an elevational side view in cross section of one other environmental protection cap assembly constructed in accordance with some embodiments of the present invention.

FIG. 6B shows an alternative configuration for an environmental cap assembly 130 that has an inverted, substantially cup-shaped body 131 that is configured to slidingly engage the free end of the exhaust vent conduit 122 to provide an environmental cover for the conduit end. The body 131 has an angled top portion 132 that extends from horizontal at a selected extension angle. The extension angle can be of any suitable angular value, such as, by way of example and not limitation, from about 30 to 70 degrees. One suitable angle is on the order of 45 degrees, allowing conformance to vent pipes having a distal end cut to this angle as is common in the art. An annular sidewall 134 extends downwardly from the angled top portion 132 and is dimensioned to closely fit against the upper end of the vent conduit 122.

A hollow, cylindrically shaped nipple portion 136 extends upwardly from a bore in the top portion 132. The nipple portion 136 has one or more holes 136A near its upper end. A cylindrically shaped whistle member 110B is pressed into the nipple portion 136 so as to be activated by pressurized fluid that leaks from the upstream normally closed valve and passes into the vent conduit 122.

A tether 124 (lanyard), such as an aircraft cable or nylon cord, can be configured such that one end 124A is attached to the angled top portion 132 such as by a rivet 137 or other staking mechanism. An opposing loop end 124B of the tether 124A can be looped about the vent conduit 122 or secured in any suitable fashion.

Figure 6C:
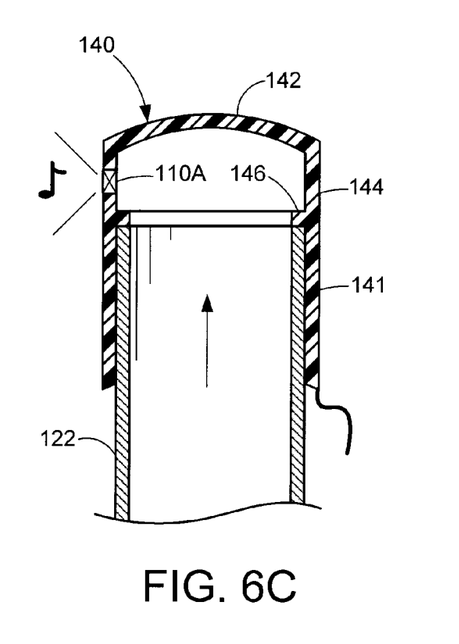
FIG. 6C is an elevational side view in cross section of yet another environmental protection cap assembly constructed in accordance with some embodiments of the present invention.

FIG. 6C shows an alternative configuration for a protective cap assembly 140 that has an inverted, substantially cup-shaped body portion 141 that is configured to slide onto the free end of the exhaust vent conduit 122 to provide an environmental cover for the conduit end. The cap assembly 140 has a domed top portion 142 and an annular, circumferentially extending sidewall 144. A whistle 110A is supported in a bore in the sidewall 144. As desired, an inwardly directed annular rib 146 provides a shoulder stop that is dimensioned to contactingly engage the end of the conduit 122.

Figure 7A:
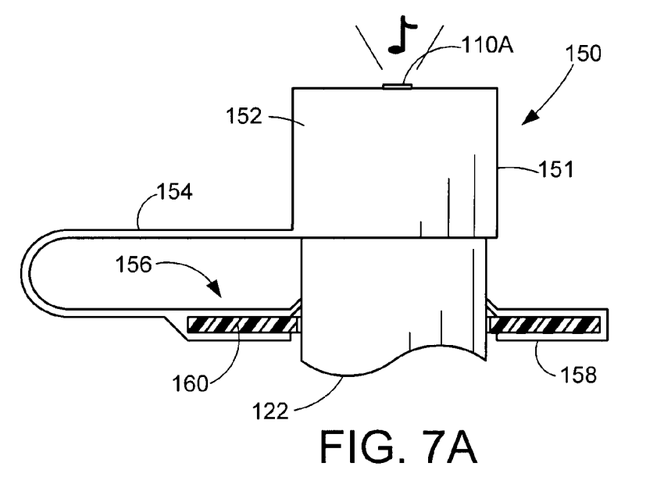
FIG. 7A is an elevational side view of one embodiment of the environmental protection cap assembly mounted to a conduit end.
Figure 7B:
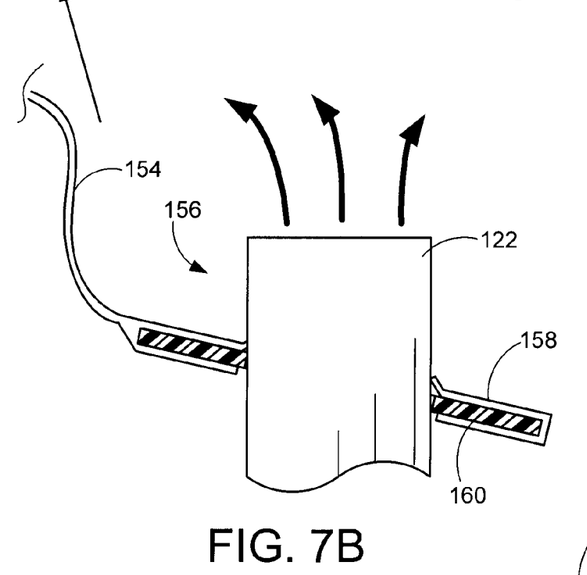
FIG. 7B is a partial elevational side view of the environmental protection cap assembly of FIG. 7A with the protection cap assembly blown from the conduit end.

FIGS. 7A-7B show another configuration for a protective cap assembly 150 that is preferably of a single piece construction, and that has an inverted, substantially cup-shaped body portion 152 that is configured to slide onto the free end of the vent conduit 122 to provide an environmental cover for the conduit end. The body portion 152 is similar in configuration to the body portions of the cap assemblies 120, 130 and 140 of FIGS. 6A-6C, and may take any of the shapes of those cap assemblies. An elongated lanyard portion 154 extends from the cover 152 to a retention ring 156.

The retention ring 156 has an outward cover 158 in which is embedded a circular washer 160. The inner diameter of the washer 160 is preferably determined to be slightly larger than the outer diameter of the vent conduit 122 and having an inner diameter surface in near proximity to the outer surface of the vent conduit 122. As the body portion 152 is forced from the vent conduit by exhausted pressurized fluid, the lanyard 154 will pull and cant the washer 160 to engage against the outer surface of the vent conduit 122, and the frictional force between the washer 160 and outer vent surface will serve to retain the washer 160 on the vent conduit 122.

The body portion 152, lanyard 154 and outward cover 158 are preferably formed by a molding process as a single unit. Suitable materials include PVC or other plastics with UV inhibitors. Top cover 152 includes a whistle, such as the whistle 110A, to produce an audible sound to indicate a leak of pressurized fluid when the upstream valve is in the closed position. When the upstream valve operates to blow off pressurized fluid, the escaping pressurized fluid will displace the top cover 152 from the end of the vent conduit 122, as shown in FIG. 7B.

Figure 8:
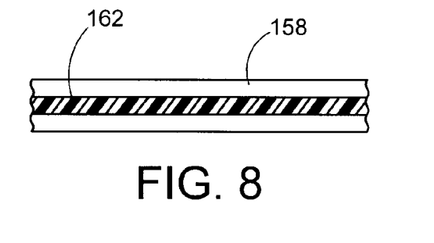
FIG. 8 is a side-elevational, cross-sectional view of a laminated portion of the protection cap assembly of FIGS. 7A-7B.

The washer 160 is preferably made from an acceptable metal or a rigid or semi-rigid plastic (such as PVC), and the washer 160 can be exposed along the inner diameter of the retention ring 156 to engage the outer surface of the vent conduit 122, or the washer may be totally embedded in the outward cover 158. As shown in FIG. 8, the As desired, the molded outward cover 158 may be strengthened by including therein embedded strengthening web 162, such as, for example, a corded ribbon of a suitable material.

Figure 9:
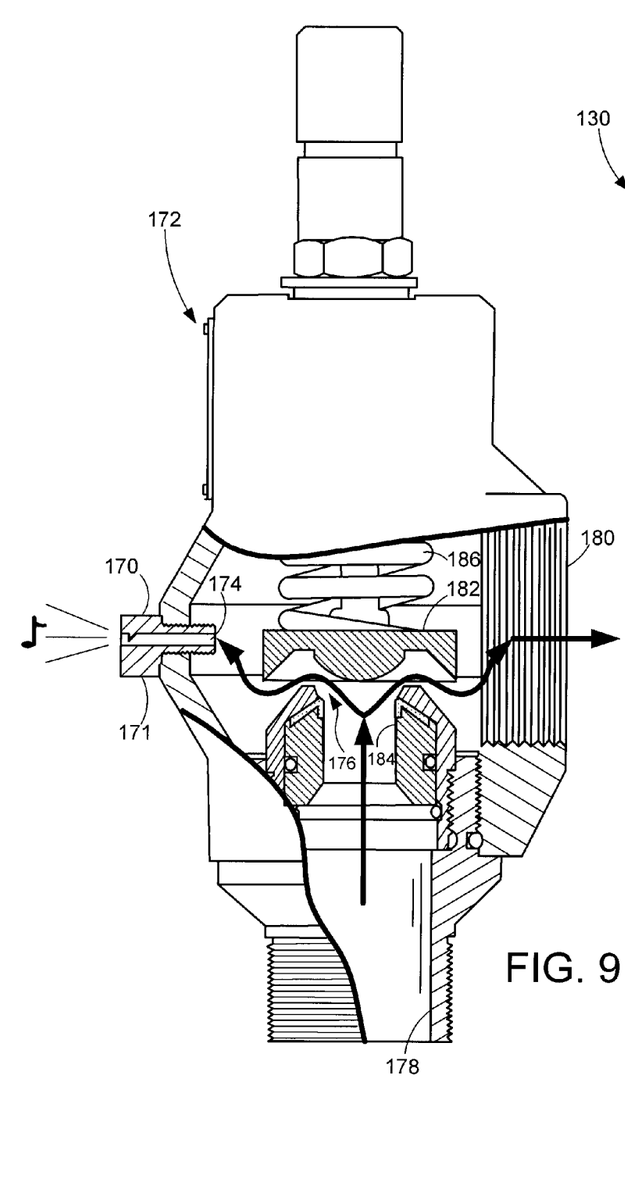
FIG. 9 is a side elevational view in cross section of an environmental protection cap assembly constructed in accordance with some embodiments of the present invention and threadingly inserted into the body of a pressure relief valve.

FIG. 9 shows yet another cap assembly 170 in accordance with some embodiments. The cap assembly 170 has a plug shaped body portion 171 that threadingly engages a threaded bore in a pressure relief valve 172 and is disposed in fluid communication upstream to the outlet port. Unlike the caps discussed above, the cap assembly 170 is not configured to be displaced from the valve when the pressure relief valve 172 is opened to blow off pressurized fluid. The body portion 171 includes an integrated whistle 174 along an interior conduit that provides an audible sound when a leak occurs through a valve seat interface 176 that is disposed between an inlet port 178 and an outlet port 180 of the pressure relief valve 172.

It will be noted that the valve seat interface 176 is established by the forced engagement of a sealing piston 182 upon a stationary valve seat 184 via spring 186. When the force of the spring 184 is exceeded by the force of the pressurized fluid in an inlet conduit (not shown) to which the pressure relief valve is connected, the piston 182 will be forced away from the valve seat 184 and the pressurized fluid will flow to the outlet port 180. Audible noise generated by the whistle 174 in response to pressurized fluid may or may not occur when the valve 182 is in the open position, but an audible sound will be generated when a leak pressure is within the valve 172 downstream of the seal valve seat 184 when the valve is closed.

Figure 10:
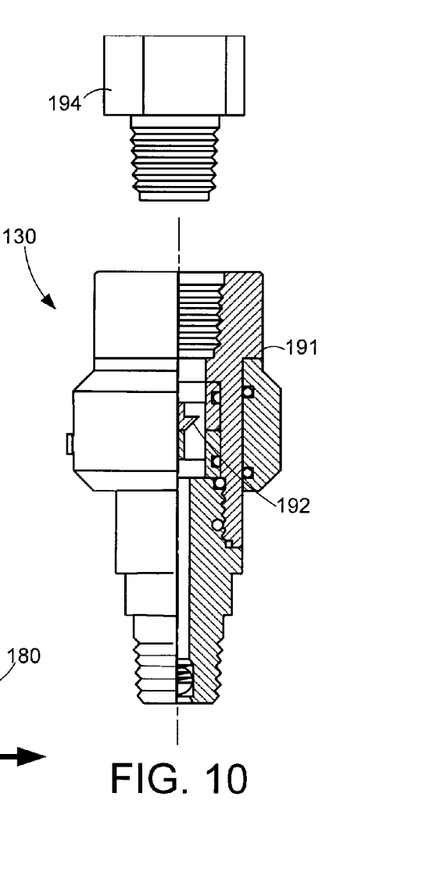
FIG. 10 illustrates a protection cap assembly as part of an insert that can be permanently installed into a pressure relief valve or conduit.

FIG. 10 shows a cap assembly 190 having a body portion 191 with an integrated whistle 192. As desired, the cap assembly 190 may be installed in any available threaded port such as the valve body bore supporting the cap assembly 170 in FIG. 9. Thus, it will be appreciated that the cap assembly may be characterized as a probe adapted to engage the body of a valve, a conduit, or some other location within a pressurized system. A threaded plug 194 can be used to seal off the cap assembly 190 as desired. Service personnel can remove the threaded plug 194 and listen for the generation of acoustic noise from the flow of escaping fluid through the probe 190.

Figure 11:
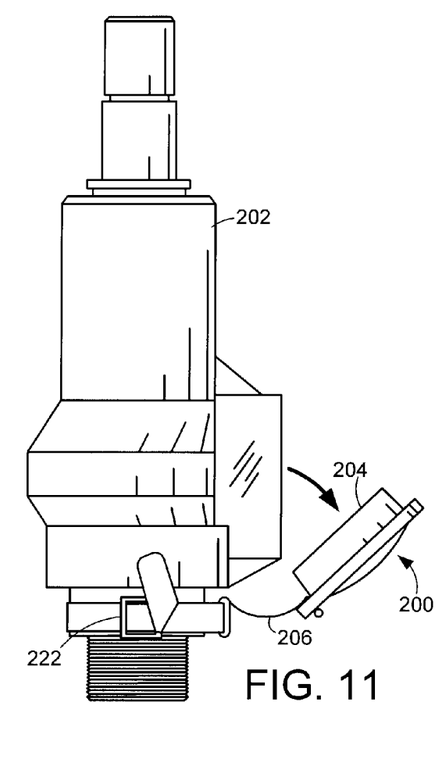
FIG. 11 is a side elevational view of another environmental protection cap assembly constructed in accordance with some embodiments of the present invention mounted on a pressure relief valve.

FIG. 11 shows yet another configuration for a cap assembly 200 in accordance with some embodiments. The cap assembly 200 is positioned in removable engagement with the outlet port of a valve 202. Unlike the cap assembly 102 of FIGS. 1-2, the cap assembly 200 has a cylindrically shaped plug body portion 204 and a strap portion 206, the strap 206 securing the plug 204 to the body portion of the valve 202. The strap 206 has sufficient length to allow the body portion 204 to fall by gravity away from the blown pressurized fluid from a vent conduit (not shown) to which the pressure relief valve 202 is connected. It will be appreciated that the cap assembly 102 of FIGS. 1-2 can be similarly attached as desired.

Figure 12:
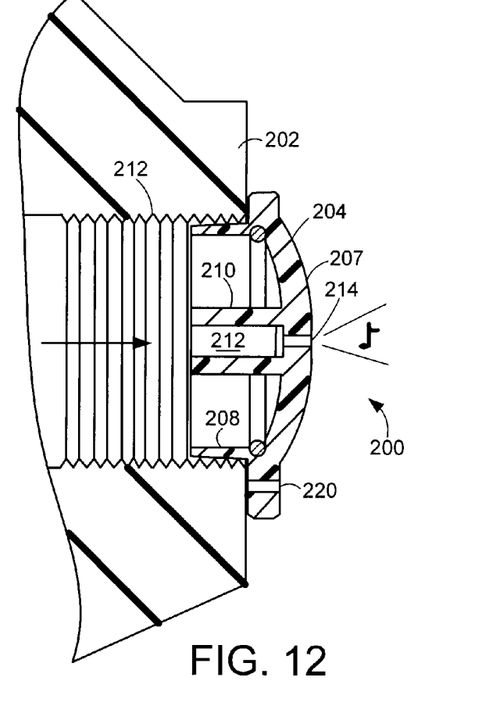
FIG. 12 is a cross sectional enlarged view of the environmental protection cap assembly mounted on the pressure relief valve of FIG. 11.

The body portion 204 of the cap assembly 200, as shown in FIG. 12, has a dome shaped portion 207, an outer annular flange 208 and an inner annular flange 210. The outer annular flange 208 is sized to contactingly engage threads of the outlet port of the pressure relief valve 202. The inner annular flange 210 is cylindrically shaped to form a nest to receive and support a whistle 212. An outlet bore 214 in the dome shaped outer portion 207 allows passage of pressurized fluid from the whistle 212 to the surrounding atmosphere, producing an audible sound indicative of an upstream leak of pressurized fluid. A rigid strengthening ring 216 can be provided as shown to stiffen the plug 204 while retaining flexibility of the outer flange 208 to facilitate positioning the plug 204 to engage the outlet port of the valve 202.

Figure 13A:
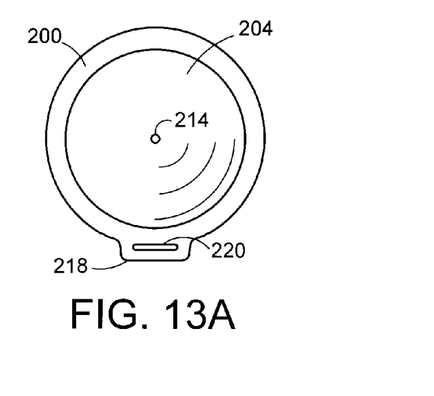
FIG. 13A is a top plan view of the environmental protection cap assembly of FIG. 11.
Figure 13B:
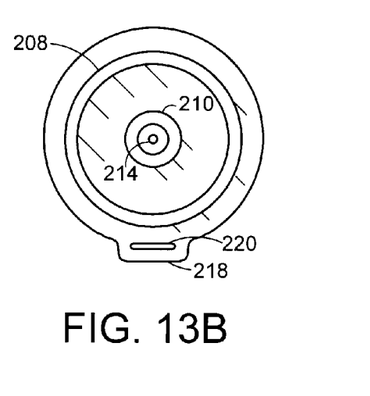
FIG. 13B is a bottom plan view of the environmental protection cap assembly of FIG. 11.
Figure 14:
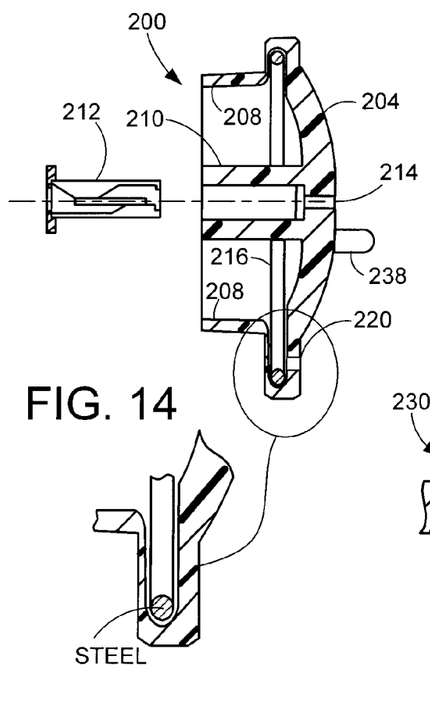
FIG. 14 is a cross sectional elevational view of a whistle that is to be inserted into the environmental protection cap assembly of FIG. 11.

FIGS. 13A and 13B are top and bottom plan views of the cap assembly 200. The body portion 204 has an outwardly extending tab portion 218 having a connector slot 220 is provided to which one end of the strap 206 connects as shown in FIG. 11. A buckle 222 on the other end of the strap 206 serves as a hook-and-loop fastener to fasten that end to the body portion of the pressure relief valve 202. FIG. 14 shows the cap assembly 200 and the whistle 212, removed to depict the insertion path as it is inserted into the inner annular flange 210, which may be a reed-type whistle.

The dome-shaped cap assembly 200 preferably is made of a generally pliable plastic material with physical yield properties so as to be easily mounted to the outlet port of the relief valve 202. This permits the cap assembly 200 to bulge in the presence of vented fluid thereby drawing inwardly the outer flange 208 and allowing the cap to be easily displaced from the valve. As before, the strap 206 secured to the valve 202 assures that the protection cap 200 will remains tethered when the pressure relief valve 202 is actuated to blow off pressurized fluid.

Figure 15:
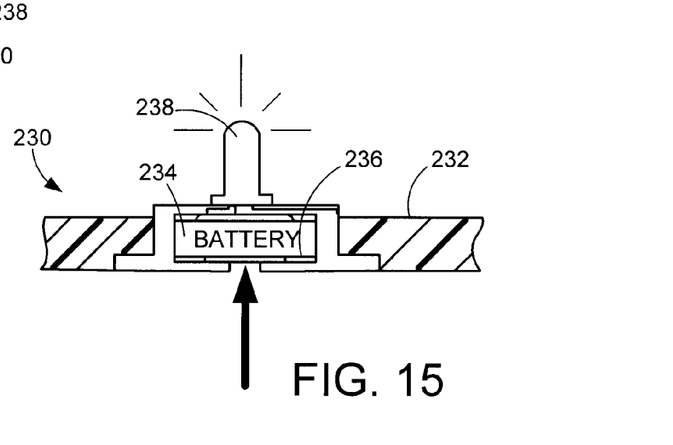
FIG. 15 is a schematic representation of a protection cap assembly with a visual indicium to signal the presence of a leak.
Figure 16A:
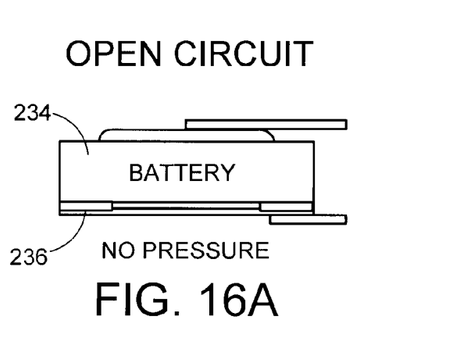
FIG. 16A is the schematic representation of FIG. 15 in an open circuit condition.
Figure 16B:
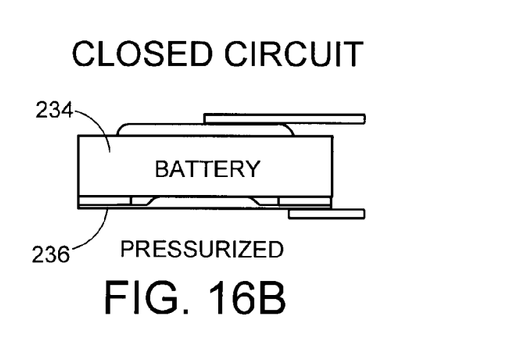
FIG. 16B is the schematic representation of FIG. 15 in a closed circuit condition.

The embodiments described herein above have featured a whistle member that provides an audible sound in the event that an upstream leak of pressurized fluid occurs, the leak being insufficient to blow off a cap assembly from an exhaust vent conduit or from a supporting port or bore of a pressure relief valve, but sufficient to activate the whistle. Attention is now directed to FIG. 15, in which a different sensory indication mechanism is provided in accordance with some embodiments of the present invention.

FIG. 15 is a schematic representation of a cap assembly 230 that may be configured for support by a cap assembly or by a valve, as desired. The cap assembly 230 has a body portion that includes an annular cover 232 and houses a battery 234 (such as a disc or watch-type battery) having upper and lower positive and negative contacts, respectively. A thin film of conducting material 236, such as Mylar with an electrically conductive coating, is placed adjacent to the bottom terminal of the battery 234.

A light emitting device, such as an LED (light emitting diode) 238, is configured to contactingly engage the top terminal and the layer of electrically conductive coating. When leaking pressurized fluid exerts pressure against the cover 232, the conducting material 236 contacts the bottom terminal of the battery, closing the switch and causing electrical current to flow through the LED 238. This provides a visual indication of the presence of leaking pressurized fluid. It will be appreciated that the LED 238 may be used in lieu of, or in addition to, the various whistles presented above.

Figure 17:
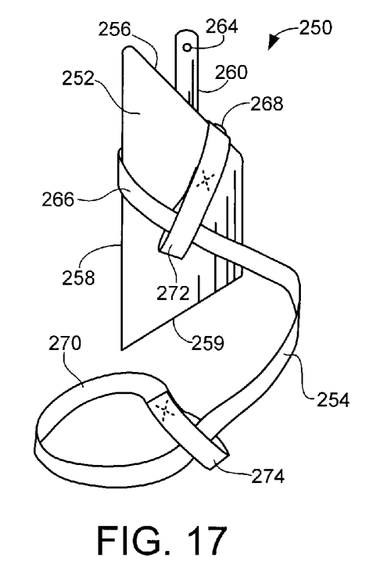
FIG. 17 is an isometric depiction of another protection cap assembly constructed in accordance with various embodiments.
Figure 18:
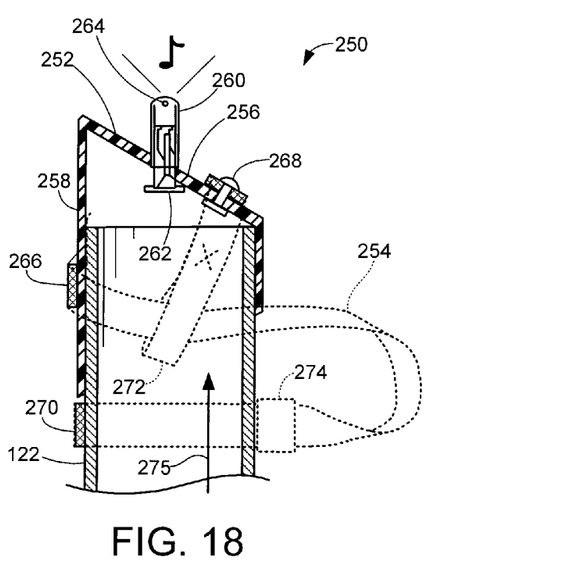
FIG. 18 is an elevational, cross-sectional view of the assembly of FIG. 17.

FIGS. 17-18 illustrate another exemplary embodiment of an environmental protection cap assembly 250 generally similar to the various embodiments discussed above. The assembly 250 includes a protection cap 252 and tether 254. The cap 252 includes an angled top portion 256 and annular sidewall 258 sized to slidingly engage an exterior surface of vent conduit 122. A nipple 260 extends from the angled top portion 256 and houses a whistle 262. Pin-holes 264 extend through the distal end of the nipple 260 as before.

The angle of the top portion 256 can vary and will preferably be within a range of from about 30 to 70 degrees, although other angles and shapes can be used as discussed herein. A bottom annular surface 259 of the sidewall 258 extends at a second angle that may be from about 20 to 40 degrees, although other shapes and angles can be used. The top and bottom angles can be equal if desired.

The tether 254 is characterized as taking a double lariat, or double slip loop configuration. A first (upper) loop 266 is provided at a first end of the tether 254 and is configured to lay across the top portion 252 and along a portion of the sidewall 258 as shown. A rivet 268 attaches the first loop to the cap 252 at a single attachment point, although other securement arrangements are contemplated. A second (lower) loop 270 is provided at an opposing second end of the tether 254 and is configured to slidingly engage the outer surface of the vent conduit 122.

The tether 254 is formed of a suitable flexible and strong material, such as but not limited to nylon or polypropylene fabric. The fabric may be doubled back and stitched to form respective closed passageways 272, 274 through which the tether is routed to provide the respective first and second loops 252, 254. The loops can be tightened and loosened as required. The whistle 262 is configured to emit a sensory indication (audible whistle) responsive to a flow of leaked pressurized fluid through the closed upstream valve, as denoted at arrow 275 in FIG. 18.

Figure 19A:
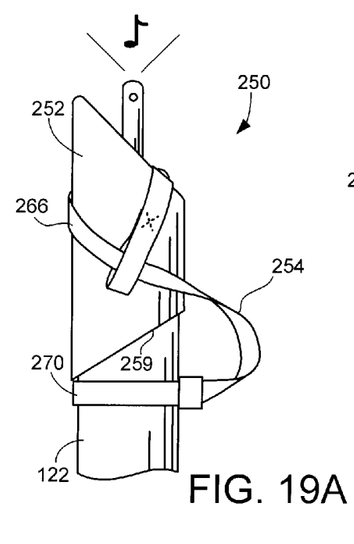
FIG. 19A shows the cap assembly of FIG. 17 while the valve is in the closed position.

FIG. 19A is an elevational depiction of the installed cap assembly 250 while the upstream valve assembly is in the closed position. The cap 252 will provide a sufficient sealing of the end of the vent conduit 122 such that the presence of leaking pressurized fluid through the valve (see 275, FIG. 18) will tend to build up pressure and induce an audible sensory indication of the leak as the leaking fluid passes through the whistle 262 and the pin holes 264 in the nipple 260.

Figure 19B:
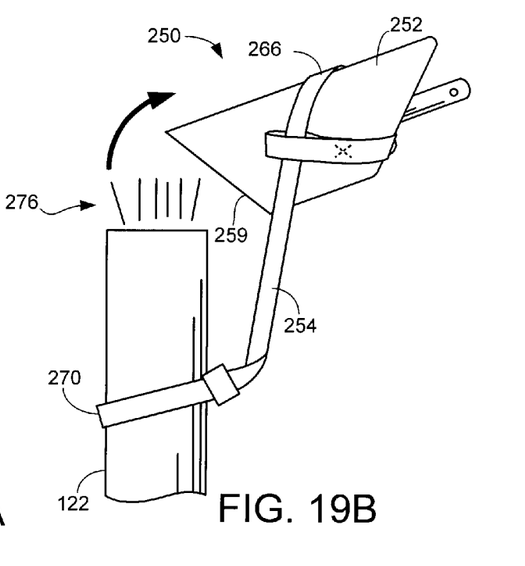
FIG. 19B shows the cap assembly of FIG. 17 as the valve transitions to the open position.

FIG. 19B shows the cap assembly 250 responsive to the upstream valve assembly transitioning to the open position. A flow of pressurized fluid, indicated by lines 276, will generally eject the cap 252 from the distal end of the vent conduit 122 in the manner shown. It is contemplated that the angled bottom surface 259 of the cap 252 may advantageously induce rotation of the cap, causing the cap to move to one side and away from an axial centerline of the vent conduit. This can help to reduce the energy imparted to the ejected cap by moving the cap away from the vented pressurized fluid stream 276.

In at least some embodiments, the cap 252 is formed of injection molded elastomeric material and is relatively malleable and flexible. In such case, the first, upper loop 266 may further induce a mechanical collapse of the cap 252, as generally represented in the end view representation of FIG. 19C.

Figure 19C:
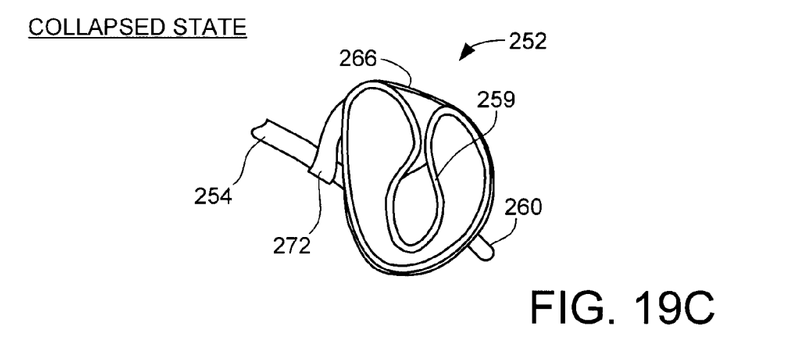
FIG. 19C is an end view representation of the cap assembly in a collapsed state as a result of the cap assembly being ejected from the vent conduit in FIG. 19B.
Figure 20A:
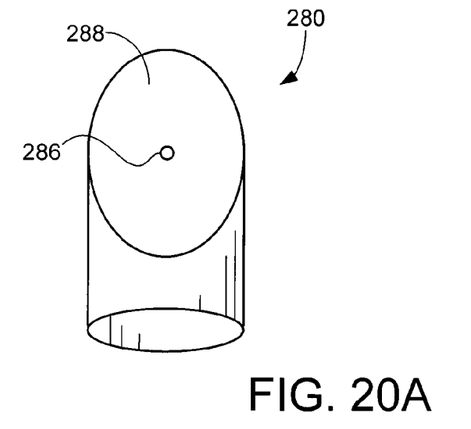
FIG. 20A is a front elevational depiction of another embodiment of a protective cap assembly generally similar to the assembly of FIGS. 17-19.
Figure 20B:
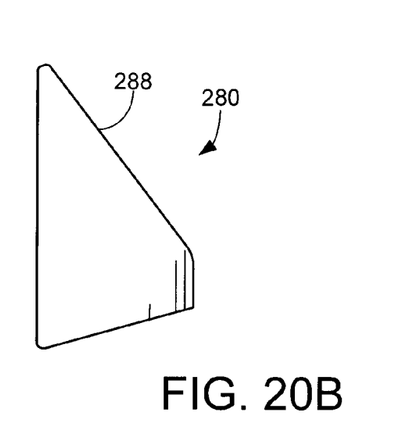
FIG. 20B is a side elevational view of the cap assembly of FIG. 20A.
Figure 20C:
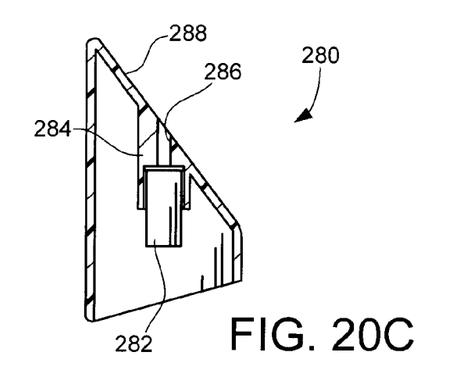
FIG. 20C shows a cross-sectional, elevational view of the cap assembly of FIG. 20A.
Figure 20D:
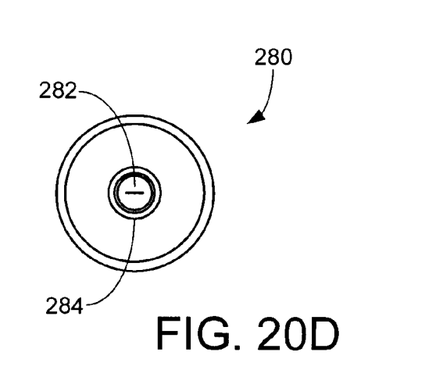

The upper loop will collapse the cap 252 by tightening about the cap circumference, which will result in a drawing in of the cap material. That is, as the cap 252 is being ejected, the lower loop 270 will tighten about the vent conduit 122, followed by the upper loop 266 tightening about the cap 252. This further reduces the energy imparted to the cap 252 in that the collapsed cap will no longer present an open cup shape, and will thus be less likely to be propelled by the exiting pressurized fluid stream 276.

Wrapping the tether 254 in this manner also reduces the amount of strain on the rivet 268, since the tether 254 is secured to the cap 252 along the entire circumferential inner surface of the upper loop 266. Empirical testing has demonstrated that the cap assembly 250 can repetitively withstand high pressure venting of pressurized fluid through a two-inch vent conduit at pressures of upwards of around 2400 pounds per square inch (psi) without damage, detachment or loss of securement to the vent conduit. The same cap can be ejected and collapsed at open exhaust pressures of as low as around 10-15 psi. This capability is believed to be unmatched by existing art solutions.

FIGS. 20A-20D illustrate an alternative cap assembly 280 in accordance with some embodiments. The cap assembly 280 is generally similar to the cap 250 of FIGS. 17-19 and can be adapted to utilize a double slip loop tether 254, as before. One difference that can be noted in the cap assembly 280 is the use of a recessed whistle 282, which is secured within an interior, downwardly extending annular sidewall 284. The whistle 282 may be press-fit into mating engagement with the sidewall, or may be secured in an alternative fashion including through the use of adhesive or some other attachment mechanism. An open passageway 286 which extends through angled top portion 288 allows communication between the whistle and the exterior environment.

As before, it is contemplated that the cap assembly 280 will be adapted to provide a sensory indication of a leak through the upstream closed valve by the tone generated by the whistle 282 while the cap assembly 280 is placed on a vent conduit. The cap assembly 280 is further adapted to be ejected from the vent conduit when the valve transitions to the open position, and collapsed by the tightening action of the tether 254 (FIG. 17).

It will be appreciated that the various embodiments of the present invention set forth a number of benefits over the prior art. The various embodiments presented herein provide a sensory indication, such as an audible and/or visual indication, that a leak of pressurized fluid is present. More generally, there is a pressure differential within a closed conduit (such as a vent conduit) and the surrounding atmosphere. Further, in at least some embodiments the cap can be further configured to be physically displaced from the end of a conduit when a valve is opened, thereby providing further sensory indication that the valve has opened. It will be appreciated that the various embodiments can be adapted to a wide variety of applications, including but not limited to pressurized vessels (tanks) and a variety of different types of valves including but not limited to pressure relief valves.

Without limitation, the various embodiments can be characterized as a method and apparatus for monitoring a pressurized fluid. In accordance with some embodiments, an environmental protection cap is coupled to a conduit associated with a valve that may communicate with the surrounding atmosphere. The cap includes a sensory indication mechanism that provides a sensory indication to service personnel that a flow of pressurized fluid is passing through the valve or otherwise through the system while the system is in a closed condition, such as a leak through a normally closed valve. In some embodiments, the sensory indication is generated by a whistle that generates an audible noise responsive to the leaking fluid passing therethrough. In other embodiments, the sensory indication is generated by an LED that activates responsive to a pressure buildup of the leaking fluid.

In still further embodiments, the cap may be configured to be displaced from the conduit, thereby providing a visual indication that the valve has transitioned to the open position.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed.

What is claimed is:

1. A protective cap assembly, comprising:
a cap assembly body adapted to be placed in fluid communication with a pressurized valve, the valve having a closed position in which fluid is sealingly impeded by a valve seat from flowing through the valve and an open position in which the valve is mechanically manipulated so that fluid is directed through the valve seat to exit the valve;
sensory means supported by the cap assembly body for providing a direct human sensory indication of pressurized fluid exhausting from the valve while the valve is in the closed position; and
a tether that retains the cap assembly body in proximity to the valve when removed so that the removed cap assembly body serves as a visual indication that the valve has opened to relieve pressure, the tether having a double slip loop configuration with a first sliding loop at a first end of said tether and adapted to fit about a circumference of the cap assembly body, and a second sliding loop at an opposing second end of the tether adapted to fit about a circumference of a vent conduit downstream of the pressure relief valve, wherein responsive to a transitioning of the valve from the closed position to the open position, the second sliding loop tightens about the vent conduit to secure the protective cap assembly thereto and the first sliding loop tightens about the cap assembly body, and wherein the tightening of the first sliding loop induces a mechanical collapse of the protective cap assembly as the assembly is ejected from the vent conduit.

2. The protective cap assembly of claim 1 wherein the sensory means comprises a whistle that makes an audible sound by pressurized fluid leaking from the valve in the closed position.

3. The protective cap assembly of claim 1 wherein the sensory means comprises a light emitting device that emits a visible light by pressurized fluid leaking from the valve in the closed position.

4. The protective cap assembly of claim 1 wherein the sensory means comprises:
a whistle that makes an audible sound by pressurized fluid leaking from the valve in the closed position; and
a light emitting device that emits a visible light by pressurized fluid leaking from the valve in the closed position.

5. A cap assembly for signaling passage of pressurized fluid from an upstream valve, the cap assembly comprising:
a body portion adapted to be supported on a vent conduit in fluid communication with the valve; and
a tether which attaches the body portion to the vent conduit, the tether having a slip loop that surrounds the body portion and tightens to mechanically collapse the body portion in response to ejection of the body portion from the vent conduit as the upstream valve transitions from a normally closed position to an open position.

6. The cap assembly of claim 5, further comprising a whistle coupled to the body portion adapted to provide a direct sensory indication of pressurized fluid leaking through the upstream valve while the valve is in the normally closed position.

7. The cap assembly of claim 5, wherein the tether further has a second slip loop adapted to surround the vent conduit and tighten thereagainst to secure the body portion to the vent conduit responsive to the ejection of the body portion from the vent conduit.

8. The cap assembly of claim 5 further comprising a light emitting device coupled to the body portion which provides a sensory indication of leaking pressurized fluid from the upstream valve.

9. The cap assembly of claim 5 wherein the slip loop is attached to the body portion using a rivet at a single attachment point.

10. A cap assembly for signaling passage of pressurized fluid from a vent conduit connected to a pressurized valve, the cap assembly comprising:
a body portion connectable in fluid communication with the vent conduit;
a sensor supported by the body portion adapted to provide a direct human sensory indication of pressurized fluid exhausting from the vent conduit responsive to a leak of said fluid through the valve while the valve is in a normally closed position; and
a tether which attaches the body portion to the vent conduit, the tether having a slip loop that surrounds the body portion and tightens to mechanically collapse the body portion in response to ejection of the body portion from the vent conduit as the pressurized valve transitions from the normally closed position to an open position, the slip loop attached to the body portion at a single attachment point.

11. The cap assembly of claim 10 wherein the sensory means comprises a whistle which generates a human detectable audible tone responsive to said leaked pressurized fluid passing therethrough, the whistle taking a selected one of a flute-type configuration or a reed-type configuration.

12. The cap assembly of claim 10 wherein the sensory means comprises a light emitting device which generates a human detectable light responsive to said leaked pressurized fluid.

13. The cap assembly of claim 10 wherein the body portion is ejected from the vent conduit responsive to exhausting pressurized fluid from the vent conduit when the valve is transitioned from the normally closed position to an open position.

14. The cap assembly of claim 10 wherein the tether retains the body portion in proximity to the vent conduit when displaced from the vent conduit so that the displaced body portion serves as a visual indication that the valve has opened to relieve pressure head.

15. The cap assembly of claim 10 wherein the tether has a retention ring washer with an internal diameter that fits over the vent conduit so that, when the body portion is forced from the vent conduit by pressurized fluid when the valve is in the open position, the tether will cant the washer to engage the vent conduit to resist removal of the washer from the vent conduit.

16. The cap assembly of claim 10 further comprising a rivet that attaches the slip loop to the body portion at a single attachment point.

17. The cap assembly of claim 10 in which the tether has a second slip loop at an opposing end of the tether adapted to secure the tether to the vent conduit.

18. The cap assembly of claim 17 wherein ejection of the body portion responsive to transitioning of the valve from the closed position to an open position induces a tightening of each of the respective first and second slip loops.

19. A cap assembly for signaling passage of pressurized fluid from a vent conduit connected to a pressurized valve moveable between a closed position and an open position, the cap assembly comprising:

a body portion adapted to cover a distal end of the vent conduit, the body portion having an annular sidewall sized to fit about an annular outermost surface of the distal end of the vent conduit and a top portion which extends across the annular sidewall to enclose said body portion, the top portion extending at a first angle non-orthogonal with respect to a longitudinal axis of the vent conduit, a bottom edge surface of the annular sidewall extending at a different second angle non-orthogonal to the longitudinal axis of the vent conduit;

a whistle coupled to the body portion in fluidic communication with an interior of the vent conduit; and a tether having opposing first and second ends, the tether forming a first loop at said first end that surrounds and contactingly engages the body portion and a second loop at said second end that surrounds and contactingly engages the vent conduit, wherein while the valve is in the closed position, the body portion is adapted to remain disposed on the distal end of the vent conduit and the whistle is adapted to emit a human audible whistle responsive to a leak of pressurized fluid through the pressurized valve.

20. The cap assembly of claim 19, in which the body portion is further adapted to be subsequently ejected from the distal end of the vent conduit by a flow of pressurized fluid through the pressurized valve responsive to the valve transitioning from the closed position to the open position.

21. The cap assembly of claim 20, in which the first loop is characterized as a slip loop which tightens to collapse the body portion responsive to the body portion being ejected from the distal end of the vent conduit responsive to said flow of pressurized fluid.

22. The cap assembly of claim 19, wherein the whistle is characterized as a flute type whistle that restricts the passage of fluid to produce an audible sound in a range of human hearing.

23. The cap assembly of claim 19, wherein the whistle is characterized as a reed type whistle with an interior reed member adapted to produce an audible sound in a range of human hearing.

* * * * *